Oct. 17, 1933.  M. E. HEYER  1,931,148

AWNING HEAD ROD BRACKET

Filed Oct. 27, 1932

INVENTOR
M. E. Heyer
BY Frease and Bishop
ATTORNEYS

Patented Oct. 17, 1933

1,931,148

UNITED STATES PATENT OFFICE 1,931,148

AWNING HEAD ROD BRACKET

Martin E. Heyer, Cleveland, Ohio, assignor to The Astrup Company, Cleveland, Ohio, a corporation of Ohio Application October 27, 1932. Serial No. 639,816

10 Claims. (Cl. 156—15)

The invention relates to brackets for clamping the head rod of an awning in position upon a wall and the like, and more particularly to a bracket including a spring pressed clamping member which may be quickly and easily adjusted to release the head rod.

Prior head rod bracket constructions for stationary awnings have included a movable clamping member adapted to be removed for releasing the head rod, but securing means such as screws or bolts are provided for holding the movable clamping member in clamping position, and these screws or bolts are easily lost during the installing or dismantling of the awning.

In installing an awning with these prior bracket constructions, the movable clamping members are removed by removing the screws or bolts, to permit insertion of the head rod. After the head rod is in place, the clamping members are placed in clamping position and maintained in that position by tightening the screws or bolts sufficiently to hold the head rod against wind play and other loads imparted to the awning.

When it is desired to dismantle the awning, the securing means are removed to allow removal of the head rod. These operations necessarily involve considerable time and trouble, and usually require the use of tools; and this is especially true when the parts become rusted or corroded together as a result of exposure to the elements.

Accordingly, it is an object of the present invention to provide a head rod bracket having clamping means operable, without the use of screws or bolts or manipulation of any other securing means, to clamp and unclamp the head rod.

Another object is to provide a bracket having a movable clamping member automatically yieldingly maintained in clamping or unclamping position.

A further object is to provide a bracket having clamping means which includes no parts capable of being removed and likely to become lost.

Another object is to provide a bracket having clamping means so constructed that corrosion will not impair the easy manipulation of the parts for clamping and unclamping the head rod.

A further object is to provide a bracket having clamping means adapted normally to hold the awning head rod firmly against wind play and the like.

And finally, it is an object of the present invention to provide an improved bracket embodying all of the foregoing objectives in a simple and inexpensive construction, which is remarkably easy to install and manipulate.

These and other objects are attained by the improvements comprising the present awning bracket construction, preferred embodiments of which are hereinafter described in detail and shown in the drawing, and which may be stated in general terms as including a base member adapted to be attached to a wall or other support, a movable member associated with the base member, the base member and the movable member being provided with cooperating clamping portions adapted to clamp around an awning head rod, and spring means forcing the movable member against the base member to hold the movable member in clamping and unclamping position.

In the accompanying drawing forming part hereof,

Similar numerals refer to similar parts throughout the several views.

Figure 1:
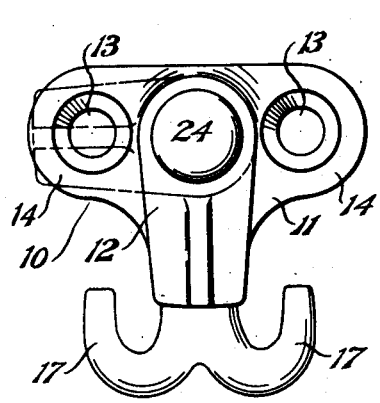
Figure 1 is a front view of the improved awning head rod bracket.

The improved awning head rod bracket indicated generally at 10, preferably includes a base member 11 and a movable member 12. The bracket 10 is adapted to be attached to a wall or other support, as by screws inserted in spaced holes 13, which are provided in the ears 14 of the base member 11. In the drawing I have shown the bracket 10 as attached to a wooden support 15 by wood screws 16, but it will be understood that bolts or lag screws may be substituted for the screws 16, if the bracket is to be attached to stone, brick or concrete and the like.

The bracket 10 is preferably provided at its lower portion with one or more hooks 17 for supporting awning cord pulleys thereon.

Figure 3:
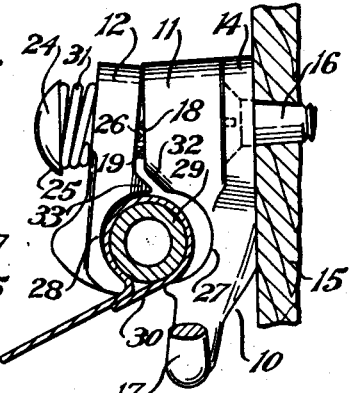
Fig. 3 is a view similar to Fig. 2, showing the position of the parts when the awning is under a heavy load.
Figure 4:
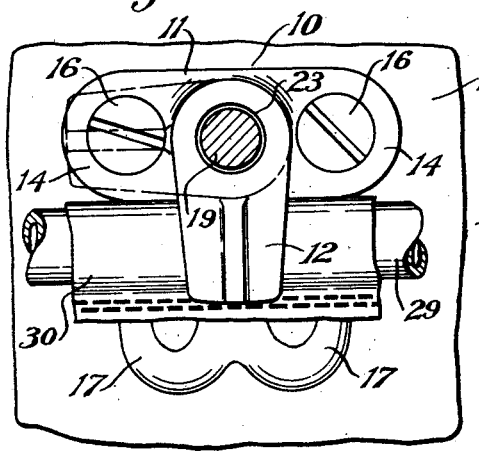
Fig. 4 is a view similar to Fig. 1 showing a portion of the awning and its head rod clamped by the bracket.
Figure 5:
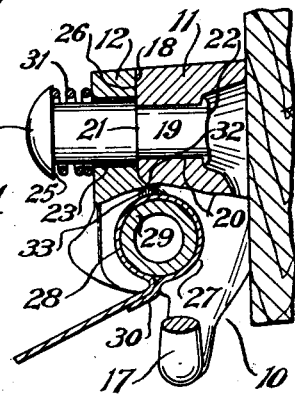
Fig. 5 is a partially sectional view similar to Fig. 3.

Referring first to Figs. 1 to 5, inclusive, the base member 11 is preferably provided with an abutment face 18 from which a stud 19 projects outwardly. The stud 19 may be in the form of a shouldered rivet, as best shown in Fig. 5, inserted in an aperture 20 in the base member, having its shoulder portion 21 in abutment with the face 18 of the base member 11. The inner end of the rivet may be swaged as at 22 against the adjacent edge portion of the base member to hold the rivet against outward movement.

The movable member or finger 12 is loosely journaled on the stud or rivet 19 as by providing an aperture 23 in the member 12 slightly larger in diameter than the rivet, through which the rivet extends, as shown in Fig. 5. The outer end of the rivet is preferably provided with an enlarged head 24, forming a shoulder 25.

The movable member 12 is preferably provided with an abutment face 26 for abutting the abutment face 18 of the base member 11. Below their abutment faces, the base member 11 and movable member 12 may be provided with cooperating substantially semi-cylindric clamping portions 27 and 28, respectively, which are adapted to clamp around the awning head rod 29 and the hem of the awning fabric 30 surrounding the same.

Resilient means for forcing the finger 12 inwardly against the base member 11 so that the faces 26 and 18 are normally in abutment, preferably includes a coil spring 31 interposed between the shoulder 25 of the head 24 and the finger 12, the head 24 thus comprising spring retaining means. The size of the spring 31 and the amount of compression thereon are calculated relative to the distance between the head and finger so that the spring 31 will yieldingly resist a limited outward movement of the finger 12, but further outward movement thereof is positively prevented by the several coils of the spring 31 being forced against each other between the shoulder 25 and the finger 12, as shown in Fig. 3.

Preferably, the base member 11 and movable member 12 are provided adjacent their abutment faces with cooperating cam portions 32 and 33, respectively, for assisting in maintaining the member 12 in clamping position. When the finger 12 is swung laterally to a position such as shown in dot-dash lines in Figs. 1 and 4, the cam portion 33 will ride over cam portion 32, forcing the finger 12 slightly outwardly against the yielding resistance of spring 31. The action of the spring functions to automatically hold the finger in its clamping position, as shown in full lines, as well as in any unclamping position to which it may be swung.

Figure 2:
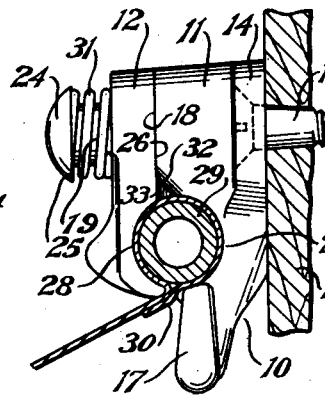
Fig. 2 is a side elevation thereof showing a portion of the awning and the head rod clamped by the bracket.

In installing an awning, assuming that the brackets 10 are all attached in position on the wall 15, the fingers 12 of the brackets are all swung laterally to a position such as indicated in dot-dash lines in Figs. 1 and 4, where they will be maintained by the action of the springs 31 without requiring the operator to manually hold them. The awning head rod 29 may then be positioned in the clamping portion 27 of the base member, after which the fingers are swung to clamping position, as shown in Figs. 2, 4 and 5, the cam portions 32 and 33 cooperating to assist in maintaining the fingers in clamping position.

When it is desired to dismantle the awning, all that is necessary is to swing the fingers 12 laterally to an unclamping position and remove the head rod from the base member.

The installing and dismantling operations do not require manipulation or screws or bolts or any other finger securing means, and leave both hands of the operator free to handle the awning proper.

Furthermore, there are no threaded or closely fitting working parts to become corroded together, making the operation of the bracket difficult, or no removable parts likely to become lost.

If unusually heavy loads, such as wind play and the like, are imparted to the awning, the springs 31 yieldingly permit a slight outward movement of the fingers 12, as shown in Fig. 3, but the abutment of the coils against each other positively prevents any further outward movement thereof, so that the head rod 29 cannot become disengaged from the bracket, and is held firmly against wind play and the like.

Figure 6:
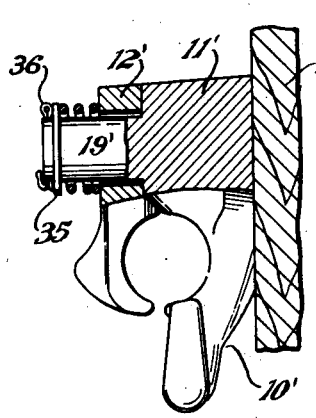
Figs. 6, 7 and 8 are views similar to Fig. 5 of modifications of the invention.
Figure 7:
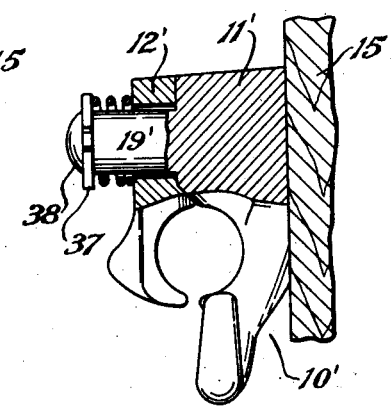

In the modified forms shown in Figs. 6 and 7, the bracket 10' includes a base member 11' having an integral outwardly projecting stud 19', upon which the finger 12' is journaled. In Fig. 6 the spring retaining means embodies a washer 35 held in place by a cotter pin 36 inserted through the end of the stud 19', and in Fig. 7 a washer 37 is held in place by the swaged end 38 of the stud 19'.

Figure 8:
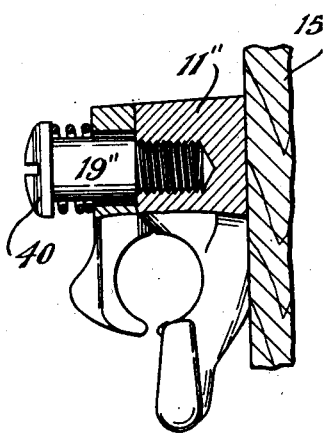

The modified form shown in Fig. 8 includes a stud screw 19'', which is screwed into the base member 11' and has a slotted head 40 at its outer end, comprising the retaining means for the spring.

The improved bracket is simple and inexpensive to construct and extremely easy to install and manipulate.

I claim:

1. An awning head rod bracket including a base member adapted to be attached to a support, a movable member associated with the base member, the base member and movable member being provided with cooperating clamping portions adapted to clamp around an awning head rod, and resilient means forcing the movable member against the base member.

2. An awning head rod bracket including a base member adapted to be attached to a support, a movable member associated with the base member, the base member and movable member being provided with cooperating clamping portions adapted to clamp around an awning head rod, resilient means forcing the movable member against the base member, and the base member and movable member being provided with cooperating cam portions for assisting in maintaining the movable member in clamping position.

3. An awning head rod bracket including a base member adapted to be attached to a support, a movable member associated with the base member, the base member and movable member being provided with cooperating clamping portions adapted to clamp around an awning head rod, and resilient means forcing the movable member inwardly against the base member, the resilient means being adapted to yieldingly resist a limited outward movement of the movable member, and to positively prevent further outward movement thereof.

4. An awning head rod bracket including a base member adapted to be attached to a support, a movable member associated with the base member, the base member and movable member being provided with cooperating clamping portions adapted to clamp around an awning head rod, resilient means forcing the movable member inwardly against the base member, the base member and movable member being provided with cooperating cam portions for assisting in maintaining the movable member in clamping position, and the resilient means being adapted to yieldingly resist a limited outward movement of the movable member, and to positively prevent further outward movement thereof.

5. An awning head rod bracket including a base member adapted to be attached to a support and provided with an outwardly projecting stud, a clamping finger journalled on the stud, the base member and finger being provided with cooperating clamping portions adapted to clamp around an awning head rod, retaining means on the outer end of the stud, and resilient means interposed between the retaining means and the finger for forcing the finger against the base member.

6. An awning head rod bracket including a base member adapted to be attached to a support and provided with an outwardly projecting stud, a clamping finger journalled on the stud, the base member and finger being provided with cooperating clamping portions adapted to clamp around an awning head rod, retaining means on the outer end of the stud, resilient means interposed between the finger and the retaining means for forcing the finger against the base member, and the base member and finger being provided with cooperating cam portions for assisting in maintaining the finger in clamping position.

7. An awning head rod bracket including a base member adapted to be attached to a support and provided with an outwardly projecting stud, a clamping finger journalled on the stud, the base member and finger being provided with cooperating clamping portions adapted to clamp around an awning head rod, retaining means on the outer end of the stud, and resilient means interposed between the retaining means and the finger for yieldingly resisting limited outward movement of the finger and positively preventing further outward movement thereof.

8. An awning head rod bracket including a base member adapted to be attached to a support, said base member having a rivet projecting outwardly therefrom, a shoulder on the outer end of the rivet, a clamping finger loosely journalled on the rivet, the base member and finger being provided with cooperating clamping portions adapted to clamp around an awning head rod, and a spring interposed between the finger and the shoulder of the rivet for forcing the finger against the base member.

9. An awning head rod bracket including a base member adapted to be attached to a support, a screw threaded in the base member and having a head on its outer end, a clamping finger loosely journalled on the screw, the base member and finger being provided with cooperating clamping portions for clamping around an awning head rod, and a spring interposed between the head of the screw and the finger for forcing the finger against the base member.

10. An awning head rod bracket including a base member adapted to be attached to a support and having an integral stud projecting outwardly therefrom, a clamping finger loosely journaled on the stud, the base member and the finger being provided with cooperating clamping portions for clamping around an awning head rod, a washer on the stud, washer retaining means on the outer end of the stud, and a spring interposed between the washer and the finger for forcing the finger inwardly against the base member.

MARTIN E. HEYER.